United States Patent

[11] 3,617,996

[72] Inventor Frederick George Herbert
 Oakton, Va.
[21] Appl. No. 879,301
[22] Filed Nov. 24, 1969
[45] Patented Nov. 2, 1971
[73] Assignee Data-Design Laboratories
 Cucamonga, Calif.

[54] SCOUR DETECTION AT BRIDGE PIERS AND THE LIKE
 8 Claims, 4 Drawing Figs.
[52] U.S. Cl. .................................................. 340/3 R
[51] Int. Cl. ..................................................... G01s 9/68
[50] Field of Search ............................................ 340/1, 1 L,
 3, 3 C, 3 F, 5

[56] References Cited
UNITED STATES PATENTS
2,629,082  2/1953  Hare.............................. 340/1

Primary Examiner—Richard A. Farley
Attorney—Harris, Kiech, Russell & Kern

ABSTRACT: Apparatus for measuring bottom scour at structures in the water, such as bridge piers, abutments, retaining walls, dams, locks, drilling rigs, lighthouses and radar platforms, A plurality of electroacoustical transducers on the structure at spaced locations and directed toward the bottom, with means for periodically energizing a transducer at each location and means for determining transit times to the bottom and return. The transit times can be viewed, recorded and compared, with differences in transit times providing a measure of scour at the bottom.

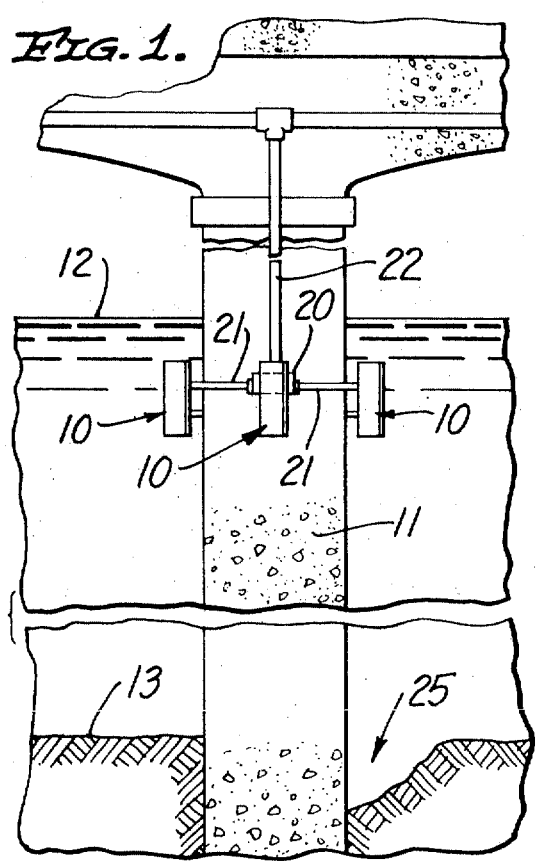
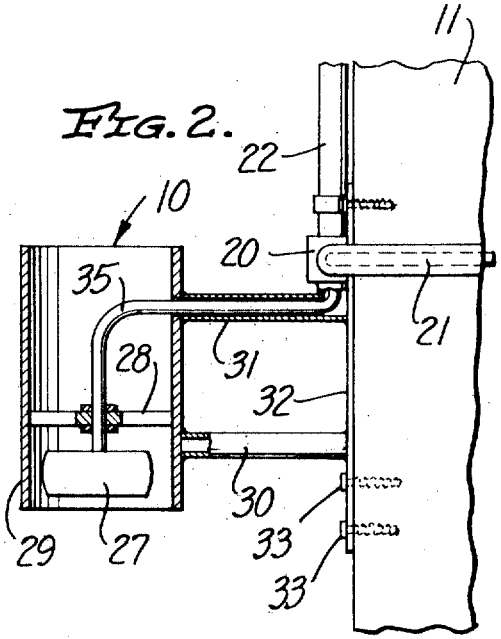

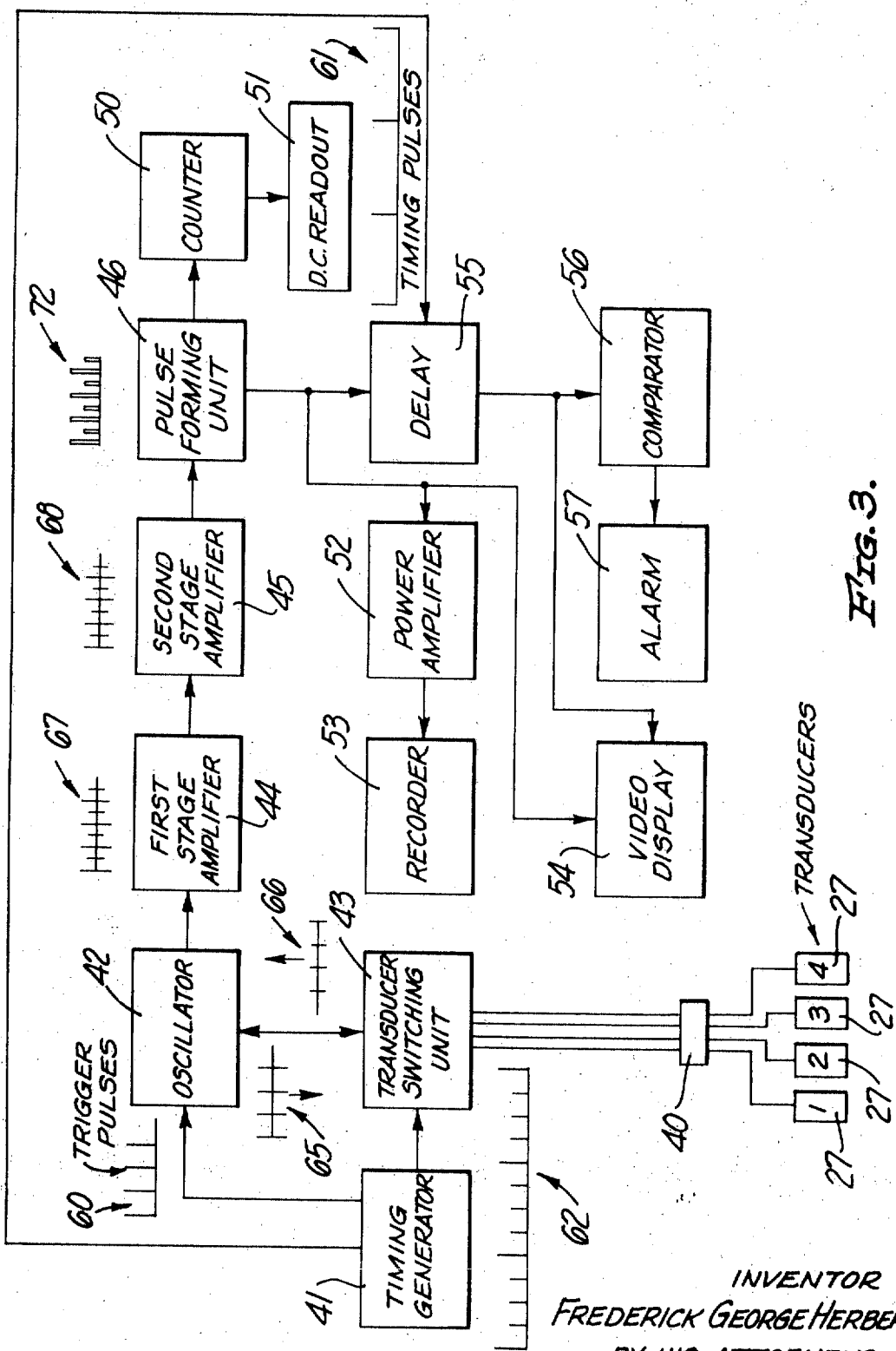

SCOUR DETECTION AT BRIDGE PIERS AND THE LIKE

This invention relates to the measurement of bottom scour at structures in the water and will be described herein as applied to a bridge pier in a river. Of course, it is equally applicable to other structures in the water, such as abutments, retaining walls, dams, locks, drilling rigs, lighthouse foundations, radar platforms and the like.

The measurement of bottom scour around bridge piers and the like is desired by agencies charged with the responsibility of maintenance of bridges and similar structures. It is particularly desirable to have the capability of measuring bottom scour during periods of high water and rapid river currents. During such periods, the water is often very cold, strongly turbulent and full of debris.

In the past, bottom scour has been measured by visual inspection using underwater divers, photographic and television means. It is an object of the present invention to provide for the detection and measurement of bottom scour without requiring bridge inspectors to enter the water or operate from a boat. A further object is to provide for automatic scour detection and to provide for detection and measurement during periods of flood or ice.

The present invention contemplates electroacoustical transducers at spaced locations along the structure and normally below the surface of the water. Bottom depth at each location is measured by means of an ultrasonic beam transmitted and received by the transducer. The travel time or transit time of the signal from the transducer to the bottom and return provides a measure of the distance of the bottom from the transducer location. The electronic equipment provides detection of scour by energizing transducers at various locations and comparing the depth measured by the transducers. The pulse data produced by the transducers may be manipulated, recorded and displaced locally at the bridge pier and/or at remote locations, providing continuous monitoring of conditions at the bottom. The apparatus is not adversely affected by flooding conditions or ice.

Other objects, advantages, features and results will more fully appear in the course of the following description. The drawings merely show and the description merely describes preferred embodiments of the present invention which are given by way of illustration or example.

In the drawings:

FIG. 1 illustrates a bridge pier with a plurality of transducers mounted thereon;

FIG. 2 is an enlarged view of a portion of FIG. 1 illustrating the installation of one of the transducers;

FIG. 3 is a diagram illustrating the electrical system of a preferred embodiment of the present invention; and FIG. 4 is a diagram illustrating the timing of the circuitry of FIG. 3.

In the structure illustrated in FIG. 1, transducer units 10 are mounted at spaced locations on a bridge pier 11 at a level between the water surface 12 and the bottom 13. In the embodiment illustrated in the drawings, four transducers are utilized, one on each side of the pier, however only three show in FIG. 1. Electrical wiring from each of the transducer units runs to a junction box 20 through conduit 21, and all of the wiring runs up the pier through another conduit 22.

A typical example of bottom scour about the pier 11 is illustrated at 25 in FIG. 1.

A transducer unit is illustrated in greater detail in FIG. 2 and includes an electroacoustical transducer 27, which may be of conventional design, mounted on a bracket 28 within a tubular guard 29. The guard 29 is supported on pipes 30, 31 affixed to a mounting plate 32 which in turn is bolted to the bridge pier 11. The electrical cable 35 from the transducer passes through the upper pipe 31 to the junction box 20 and the vertical conduit 22.

Each transducer 27 typically may be a 200 kHz. piezoelectric ceramic transducer. The guard 29 is open at both ends and does not affect the action of the transducer, but serves to protect it from debris in the water. The transducers preferably are installed below the minimum water level and below the expected freeze level. While the embodiment illustrated utilizes four transducers at spaced locations, various numbers of transducers can be used as desired for a particular installation. In an alternative arrangement, a single transducer could be used and a mechanism provided for moving the transducer from location to location along the structure. While this would effect a cost saving in transducers, the cost and maintenance of the transducer moving mechanism would outweigh this saving in most situations.

In a typical installation, the wiring from the four transducers at a bridge pier terminates in a connector box 40 (FIG. 3) located at the road level of the bridge. The remainder of the apparatus may be located at this point and plugged in at the connector box, or the connector box may be omitted, with the transducers connected directly to the remainder of the apparatus. Alternatively, the remainder of the apparatus may be positioned at a remote location and be connected to the connector box 40 by suitable cabling. The remote location may be at one end of the bridge, or at a central location where a plurality of bridges are monitored, or elsewhere as desired. In one type of installation, the apparatus may be portable and an inspector may carry the apparatus from one connector box to another for checking the condition at each of several piers or other structures.

The circuitry of FIG. 3 includes a timing generator 41, an oscillator 42, a transducer switching unit 43, amplifiers 44 and 45 and a pulse-forming unit 46. Various types of display and recording devices may be used singly or in combination, and four are illustrated in FIG. 3.

The output of the pulse-forming unit 46 may be connected to a counter 50 and a DC readout 51. The output of the unit 46 may be connected to a power amplifier 52 and recorder 53. The output of the unit 46 may be connected to a video display 54. The output of the unit 46 may also be connected through a delay 55 to a comparator 56 and alarm 57. The output of the delay 55 may also be connected to the video display 54.

The circuitry of FIG. 3 and the timing diagram of FIG. 4 utilize four transducers, which are identified as 1, 2, 3, and 4.

The circuitry of FIG. 3 provides for automatically energizing the transducers, processing the received data, and recording and displaying information representing bottom scour. THe circuitry of FIG. 3 provides for energizing each of the transducers in sequence. In an alternative arrangement, all transducers could be energized at the same time, but this would require separate circuitry for handling each transducer with a resultant increase in cost and size.

The timing generator 41 produces two signals, trigger pulses 60 for the oscillator 42 and timing pulses 61 for the delay 55. As seen in FIG. 4, there are four trigger pulses for each timing pulse, with a timing pulse coinciding with one of the trigger pulses. A combination 62 of the trigger and timing pulses is provided for the transducer switching unit 43.

The oscillator 42 oscillates a few cycles at the transducer frequency (200 kHz.) on receipt of each trigger pulse. The oscillator supplies the necessary pulse power for energizing a transducer. The oscillator output is connected to a transducer 27 by the transducer switching unit 43. The transducer switching unit connects transducer 1 to the oscillator each time the unit receives a timing pulse. On receipt of the next trigger pulse, the switching unit connects transducer 2 to the oscillator. Similarly, transducers 3 and 4 are connected to the oscillator with each of the following trigger pulses.

With transducer 1 connected to the oscillator, the pulse power from the oscillator causes the transducer to oscillate and transmit an ultrasonic signal toward the bottom. A portion of the signal energy is reflected from the bottom back to the transducer, with the remainder of the energy being scattered or absorbed. This small received signal or echo is sent from the transducer through the switching unit to the oscillator and then through the two stages of amplification. The oscillator output is illustrated at 65 and the echo signals are illustrated at 66. Both the oscillator output pulses and the echoes pass through the amplifiers and are illustrated at 67 and 68. The oscillator pulse signals and the echoes for each of the four transducers as actuated in sequence are seen in 65–68.

The time difference between an oscillator pulse and the echo pulse for a particular transducer will be a measure of the water depth from the transducer to the bottom directly below the transducer. This time interval may be manipulated in various ways to provide various types of records and displays for the depth information.

After amplification, the 200 kHz. pulse signals may be converted to DC pulses 72 in a pulse-forming unit 46, with these pulses maintaining the same time difference between each oscillator output pulse and its echo. The recorder 53 may be a typical strip chart recorder with the record paper moving at a constant speed. Distance along the chart may be calibrated directly in depth in feet so that the difference on the chart between an oscillator pulse and an echo can be read directly in feet. If bottom sour is present, the depth at the location of the scour will be greater than the depth at the other transducers and can be readily seen from the recorder chart.

The pulse pattern 72 may also be presented on an oscilloscope in the video display 54. Differences in transit time at the various transducers may be noted visually, providing an indication of the existence and location of scour.

The counter 50 may measure the time lapse between an oscillator output pulse and the echo. This time may be displayed on some type of readout meter, including a numerical presentation, and may be calibrated to read directly in depth.

In the delay unit 55, incoming pulses are transmitted to the output with a predetermined amount of delay so that the pair of pulses for one transducer will be presented to the comparator 56 at the same time as the pair of pulses for another transducer. In the particular embodiment illustrated, the pulses for the fourth transducer are not delayed and the magnitude of delay for each of the other three transducers is indicated in the timing diagram of FIG. 4 for the particular frequencies utilized. The timing pulse output from the timing generator serves to maintain the delay unit is synchronism with the transducer switching unit. The output of the delay unit may be presented directly on the oscilloscope of the video display, and could have the appearance of the bottom four lines of FIG. 4 when there is no scour. By way of example, if scour existed under transducer 3, the right pulse in the bottom line would be further to the right than in FIG. 4, indicating a greater transit time for the ultrasonic signal and a greater depth of water below the transducer. The comparator 56 functions to compare the time between oscillator pulse and echo for each of the four transducers and actuate an alarm 57 when there is a difference of some predetermined magnitude. The alarm might be a light or a signal or a chart indication or any other conventional device.

The apparatus of the invention can be used to detect bottom scour at structures in the water of rivers, lakes, seas and the like. It is primarily intended for detection of river bottom scour around bridge piers but is also useful with other structures in the water including abutments, retaining walls, dams, locks, drilling rigs, lighthouses and radar platforms. While the embodiment illustrated provides for automatic and periodic actuation of each of the transducers, the switching could be performed manually in a simplified system. Although exemplary embodiments of the bottom scour system have been disclosed, it will be understood that other applications of the invention are possible and that the embodiments described herein may be subjected to various changes, modifications and substitutions without necessarily departing from the spirit of the invention.

I claim:

1. In apparatus for measuring bottom scour at a structure in the water, the combination of:
    transducer means including at least one electroacoustical transducer;
    means for mounting said transducer means on the structure, said transducer means including means for directing acoustical signals to the bottom from spaced locations along the structure;
    means for periodically energizing a transducer at each of said locations, with a portion of the signal reflected from the bottom to the transducer; and
    means for determining the travel time of a signal from transducer to bottom and return to transducer for each of said locations, with differences in the travel times providing a measure of scour at the structure.

2. An apparatus as defined in claim 1 including means for comparing the travel times for two locations and providing an indication when said travel times differ by more than a predetermined amount.

3. An apparatus as defined in claim 1 in which said transducer means includes a plurality of electroacoustical transducers, with a transducer at each of said locations.

4. An apparatus as defined in claim 3 in which said means for energizing includes means for energizing each of said transducers in sequence.

5. An apparatus as defined in claim 1 in which said means for determining travel times includes means for generating a visual display of the travel times.

6. An apparatus as defined in claim 3 in which said means for periodically energizing includes:
    a timing generator for generating a trigger pulse for each of said transducers in sequence;
    an oscillator for generating a transducer driving signal for each trigger pulse;
    a transducer switching unit for connecting the oscillator driving signal to each transducer in sequence and in synchronism with said trigger pulses; and
    circuit means for connecting said trigger pulses to said oscillator and said switching unit.

7. An apparatus as defined in claim 2 in which said means for energizing includes means for delaying the signal at one location relative to the signal at another location by a predetermined time, and
    in which said means for comparing includes means for delaying the earlier of said travel times by said predetermined time.

8. An apparatus as defined in claim 1 in which said means for energizing includes means for delaying the signal at one location relative to the signal at another location by a predetermined time, and
    in which said means for determining includes means for generating a visual display of the travel times, and means for delaying the earlier of said travel times by said predetermined time so that the travel times are displayed at the same time.

* * * * *